(12) United States Patent
Koepp et al.

(10) Patent No.: US 8,661,652 B1
(45) Date of Patent: Mar. 4, 2014

(54) RFID TAG ASSEMBLY METHODS

(75) Inventors: Ronald L. Koepp, Seattle, WA (US); Ronald A. Oliver, Seattle, WA (US); William T. Colleran, Seattle, WA (US); Yanjun Ma, Bellevue, WA (US); Jay M. Fassett, Edmonds, WA (US); Vincent C. Moretti, Kenmore, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 13/456,653

(22) Filed: Apr. 26, 2012

Related U.S. Application Data (62) Division of application No. 12/399,913, filed on Mar. 6, 2009, now Pat. No. 8,188,927.

(60) Provisional application No. 61/035,710, filed on Mar. 11, 2008.

(51) Int. Cl.
*H01P 11/00* (2006.01)

(52) U.S. Cl.
USPC .................. 29/600; 29/592.1; 343/700 MS; 343/702

(58) Field of Classification Search
USPC ............... 29/600–601, 830–832, 592.1, 855; 343/700 MS, 868; 340/572.2–572.7
See application file for complete search history.

(56) References Cited

U.S. PATENT DOCUMENTS

| | | | | |
|---|---|---|---|---|
| 6,195,858 | B1 * | 3/2001 | Ferguson et al. | 29/25.42 |
| 6,320,753 | B1 * | 11/2001 | Launay | 361/760 |
| 6,957,481 | B1 * | 10/2005 | Patrice | 29/600 |
| 6,999,028 | B2 * | 2/2006 | Egbert | 343/700 MS |
| 7,253,735 | B2 * | 8/2007 | Gengel et al. | 340/572.7 |
| 7,260,882 | B2 * | 8/2007 | Credelle et al. | 29/600 |
| 8,188,927 | B1 * | 5/2012 | Koepp et al. | 343/700 MS |
| 2006/0033624 | A1 * | 2/2006 | Copeland et al. | 340/572.7 |
| 2006/0092079 | A1 * | 5/2006 | de Rochemont | 343/700 MS |

* cited by examiner

*Primary Examiner* — Minh Trinh
(74) *Attorney, Agent, or Firm* — Turk IP Law, LLC

(57) ABSTRACT

RFID tags are assembled through affixing an antenna to an integrated circuit (IC) by forming one or more capacitors coupling the antenna and the IC with the dielectric material of the capacitor(s) including a non-conductive covering layer of the IC, a non-conductive covering layer of the antenna such as an oxide layer, and/or an additionally formed dielectric layer. Top and bottom plates of the capacitor(s) are formed by the antenna traces and one or more patches on a top surface of the IC.

13 Claims, 10 Drawing Sheets

CONCEPTUAL DIAGRAM OF
AN ASSEMBLED RFID TAG

RFID TAG

FIG. 1

CONCEPTUAL DIAGRAM OF
AN ASSEMBLED RFID TAG

FIG. 2

DIE CONFIGURATION
COMPARISONS PRIOR TO
ATTACHMENT STEP

FIG. 3

CAPACITIVELY COUPLED INLAY
CONSTRUCTION

GALVANICALLY COUPLED INLAY CONSTRUCTION

CONCEPTUAL DIAGRAM OF AN
ASSEMBLED RFID TAG
ACCORDING TO EMBODIMENTS

FIG. 9

*TOP METAL PLATES FOR CAPACITIVE COUPLING*

RFID TAG ASSEMBLY METHODS

CROSS REFERENCE TO RELATED APPLICATIONS

This application is a divisional of U.S. Pat. No. 8,188,927 application Ser. No. 12/399,913 filed on Mar. 6, 2009 and issued on May 29, 2012.

This application claims the benefit of U.S. Provisional Patent Application Ser. No. 61/035,710 filed on Mar. 11, 2008. The disclosure of the provisional patent application is hereby incorporated by reference for all purposes.

BACKGROUND

Radio Frequency Identification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a radio section, a power management section, and frequently a logical section, a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags do not include an energy storage device, and are called passive tags.

Conventional tag assembly methods require accurate alignment of the antenna layer and the IC to ensure proper coupling of the antenna to the RF distribution bus through connection patches. Commonly, a gold or similarly topped bump is used to align the antenna connections with the RF distribution bus. This means a post-processing step with high-precision die placement onto the antenna trace and tightly controlled die mount force is required to apply the gold bump. Use of conductive adhesives requires continuous pressure and heat during cure resulting in limitations of assembly throughput.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to assembling an RFID tag through affixing an antenna of the tag to an integrated circuit (IC) by forming one or more capacitors coupling the antenna and the IC with the dielectric material of the capacitor(s) including a covering layer of the IC and/or a covering layer of the antenna. Top and bottom plates of the capacitor(s) may be the antenna traces and one or more patches formed on a top surface of the IC.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying Drawings, in which.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
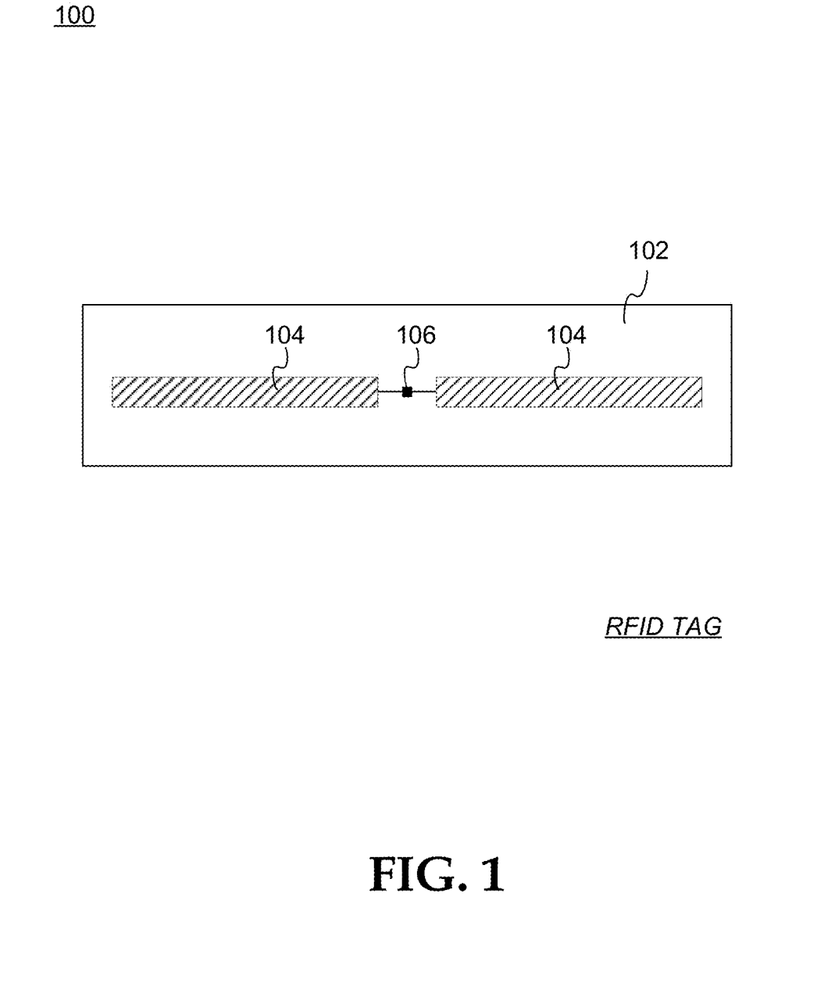
FIG. 1 is a diagram showing main components of a passive RFID tag.

FIG. 1 is a diagram of an RFID tag 100, which can be implemented as a passive tag, meaning it does not have its own power source. Much of what is described in this document, however, applies also to active tags.

Tag 100 is formed on a substantially planar inlay 102, which can be made in many ways known in the art. Tag 100 includes an electrical circuit, which is preferably implemented in an integrated circuit (IC) 106. IC 106 is arranged on inlay 102.

Tag 100 also includes an antenna for exchanging wireless signals with its environment. The antenna is usually flat and attached to inlay 102. IC 106 is electrically coupled to the antenna via suitable antenna ports (not shown in FIG. 1).

The antenna may be made in a number of ways, as is well known in the art. In the example of FIG. 1, the antenna is made from two distinct antenna segments 104, which are shown here forming a dipole. Many other embodiments are possible, using any number of antenna segments.

In some embodiments, an antenna can be made with even a single segment. Different points of the segment can be coupled to one or more of the antenna ports of IC 106. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 106. IC 106 both harvests power, and responds if appropriate, based on the incoming signal and its internal state. In order to respond by replying, IC 106 modulates the reflectance of the antenna, which generates the backscatter from a wave transmitted by the reader. Coupling together and uncoupling the antenna ports of IC 106 can modulate the reflectance, as can a variety of other means.

In the embodiment of FIG. 1, antenna segments 104 are separate from IC 106. In other embodiments, antenna segments may alternately be formed on IC 106, and so on.

Figure 2:
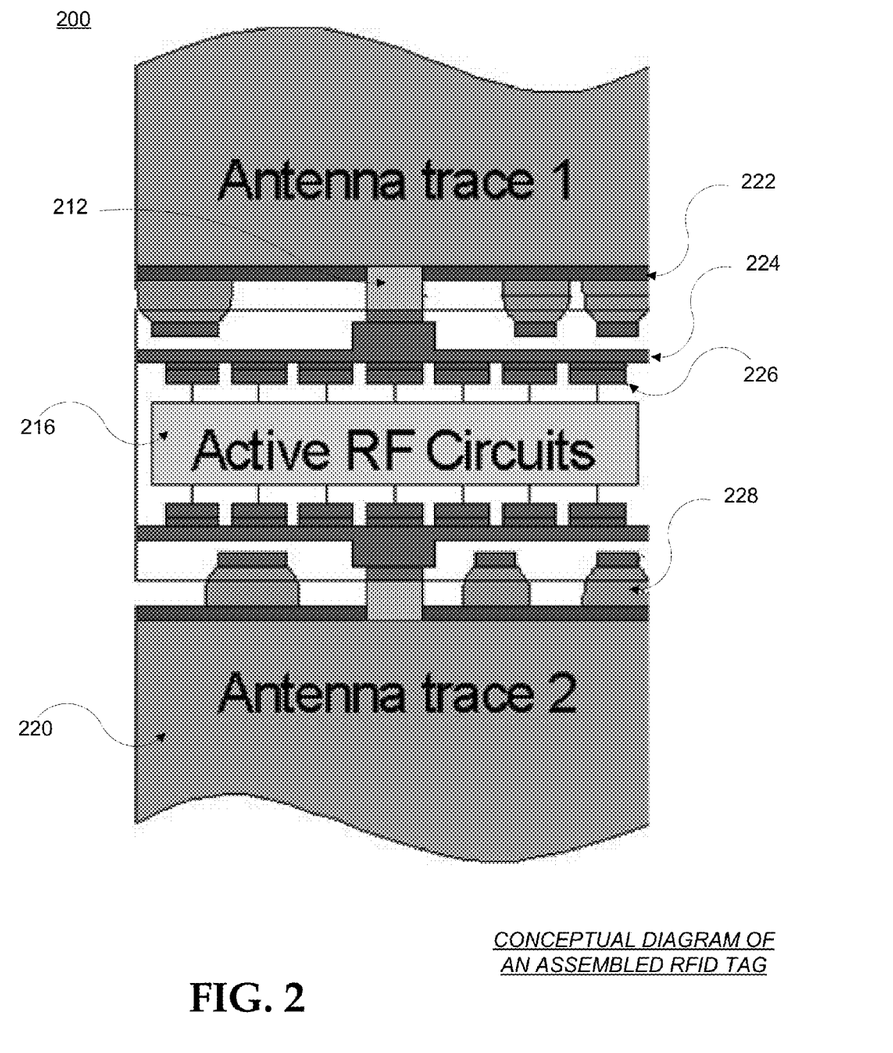
FIG. 2 is a conceptual diagram of an assembled RFID tag employing conventional assembly methods.

FIG. 2 is a conceptual diagram of an assembled RFID tag employing conventional assembly methods. An IC of a tag includes electrical circuit elements (e.g. active RF circuits 216) and traces connecting those elements. The IC may include multiple layers containing RF and non-RF circuits. Traces carrying RF signals are commonly separate from traces carrying lower frequency signals. Electrical connections for RF circuits may be coupled to an RF distribution bus 224 through coupling capacitors 226. Non-RF traces 218 may be placed apart from the RF traces.

The antenna of tag 200 is illustrates in FIG. 2 as antenna trace 1 and antenna trace 2 (220). The antenna is typically formed as a thin trace of metal—e.g. aluminum or copper—affixed onto the IC with one or more connection points for coupling the antenna to the RF circuits (through RF distribution bus 224). When a metal like aluminum is used, a naturally forming oxide layer 222 creates a hard surface between the antenna traces and the IC.

One disadvantage of conventional tag assembly methods is that an accurate alignment of the antenna layer and the IC is needed to ensure proper coupling of the antenna to the RF distribution bus through connection patches. Commonly, a gold or similarly topped bump is used to align the antenna connections with the RF distribution bus. This means a post-processing step is required to apply the gold bump. The assembly is rather difficult since it requires high-precision die placement onto the antenna trace and the die mount force must be tightly controlled.

Conductive adhesives (e.g. anisotropic conductor paste adhesive) may be employed, but they must be applied in viscous fluid form immediately prior to die placement. Use of adhesives requires continuous pressure and heat during cure resulting in limitations of assembly throughput.

A further disadvantage of conventional assembly methods includes die performance reduction through resistance in RF distribution bus and undesired parasitic capacitance (228) between the non-RF chip traces and the antenna traces. Reliability and yield problems may also increase due the chip bumps having to penetrate the hard antenna oxide layer in order to contact the antenna trace. Penetrating the oxide layer requires high mount force, exacerbating effects of parasitic capacitance by reducing separation distance between antenna traces and die surface.

Figure 3:
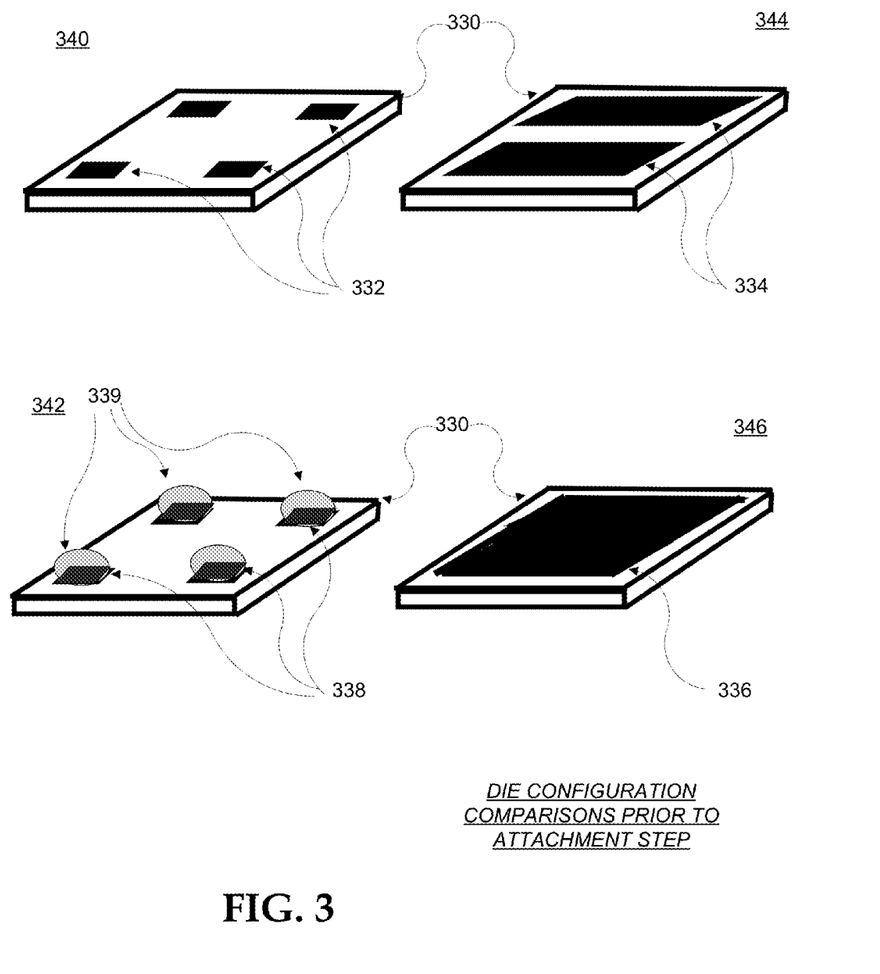
FIG. 3 illustrates comparatively different die configurations for using bumps/adhesive bonds according to conventional assembly methods and for using large pads according to embodiments.

FIG. 3 illustrates comparatively different die configurations for using bumps/adhesive bonds according to conventional assembly methods and for using large pads according to embodiments.

Die configuration 340 in FIG. 3 includes four example pads (332) formed through opening in passivation phase to a metal layer in the die 330. Configuration 342 shows the same die configuration with bumps (e.g. gold bumps) 339 added during a post-processing step and antenna pads 338 over the bumps. As discussed above, the addition of the bumps and accurate alignment of the antenna and the die present several disadvantages to tag assembly.

A tag assembly method according to some embodiments, includes forming of one or more relatively large pads (e.g. 336, 334) on a top surface of the die 330 as shown in configurations 346 and 344.

These large pads form a top layer of the die and provide a capacitive or galvanic coupling mechanism to the tag antenna. Since the coupling area is no longer concentrated, accurate alignment and parasitic capacitance concerns are largely eliminated. The capacitance of the capacitor formed between the pads (or conductive patches) and the antenna traces may be determined by controlling dielectric characteristics (e.g. composition, thickness) of non-conductive material covering the pads, non-conductive material covering the antenna traces (e.g. a naturally grown or enhanced oxide layer on aluminum traces), or even an additional dielectric material that may be disposed between the die and the antenna.

Galvanic coupling may also be provided by forming one or more "dimples" on the antenna traces and pressing the antenna onto the die such that the traces make direct contact with one or more conductive patches.

Figure 4:
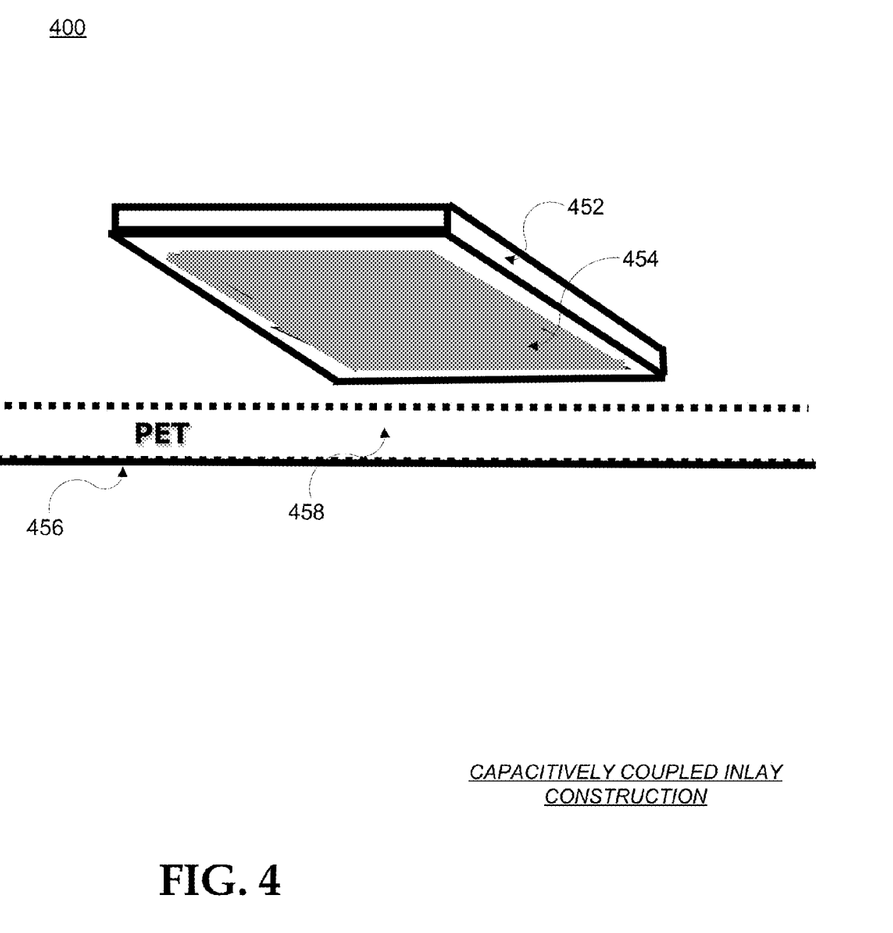
FIG. 4 illustrates an example capacitively-coupled inlay construction.

FIG. 4 illustrates an example capacitively-coupled inlay construction. Die 452 in diagram 400 is shown with a single large conductive patch 454. While the conductive patch(es) according to preferred embodiments cover a substantial portion of the die surface providing advantages with regard to parasitic capacitance, connectivity to various circuits within the die, and ease of alignment of the die and the antenna, embodiments are not limited to pads that cover substantially the entire die surface. Smaller pads may also be implemented using the principles described herein.

Tag antenna may be formed by sputtering a conductive antenna trace pattern 456 on a dielectric like Polyethylene Terephthalate (PET) 458. The die and the antenna may then be brought together through a number of methods such as heating the die and allowing it to sink into PET 458 such that a predefined thickness between the conductive patch 454 and antenna traces 456 (within given tolerances) is achieved. PET is one example of a variety of dielectric materials that may be used in a tag assembly according to embodiments. Other example materials may include, but are not limited to, Mylar, Polypropylene (PP), Polystyrene (PS), polyester, Polyimide (PI), or vinyl. Further approaches may include employing a non-conductive adhesive with controllable dielectric characteristics, and the like. The heating process includes applying heat to the die until a plasticity point of the dielectric is reached such that the IC can sink into the dielectric material. Thus, the heat range may differ depending on the material used.

Thus, a method of tag assembly according to one embodiment includes affixing the antenna to the IC of the tag by forming at least one capacitor coupling the antenna and the IC, the capacitor containing a dielectric material, where the dielectric material includes at least one of a covering layer of the IC and a covering layer of the antenna. The covering layer of the antenna may include an oxide layer formed on the conductive trace layer of the antenna such as a naturally occurring aluminum oxide, an enhanced growth of aluminum oxide, or a grown layer of aluminum nitride on a conductive trace layer of the antenna formed substantially from aluminum. A thickness of the dielectric material may vary depending on dielectric characteristics of the material and a desired minimum capacitance. A range of 5 nm to 1 µm is a practical thickness example.

The covering layer of the IC may include any non-conductive layer (e.g. Inter-Layer Dielectric "ILD") disposed over the top metal layer of the chip (conductive patches). An additional dielectric layer may also be formed between the covering layer of the antenna and the covering layer of the IC. The additional dielectric layer may include adhesive material with controlled dielectric characteristics such that a capacitance between the antenna and the IC has a predetermined value.

As discussed earlier, the one or more conductive patches on the IC surface may cover substantially the entire IC surface according to some embodiments. In case of multiple conductive patches, a plurality of capacitors are formed, where each distinct capacitor may be coupled to distinct electrical circuits of the IC such as a rectifier circuit, a demodulator circuit, or a modulator circuit enabling these circuits to be at different DC potentials.

According to other embodiments, another antenna terminal may be affixed to a second surface of the IC (opposite the first surface) forming another capacitor (or set of capacitors) on the surface of the chip. In case of multiple capacitors (and/or two-sided coupling), one or more of the capacitive couplings may be modified to galvanic coupling by providing a direct contact between the antenna trace and the conductive patch on the IC.

Figure 5:
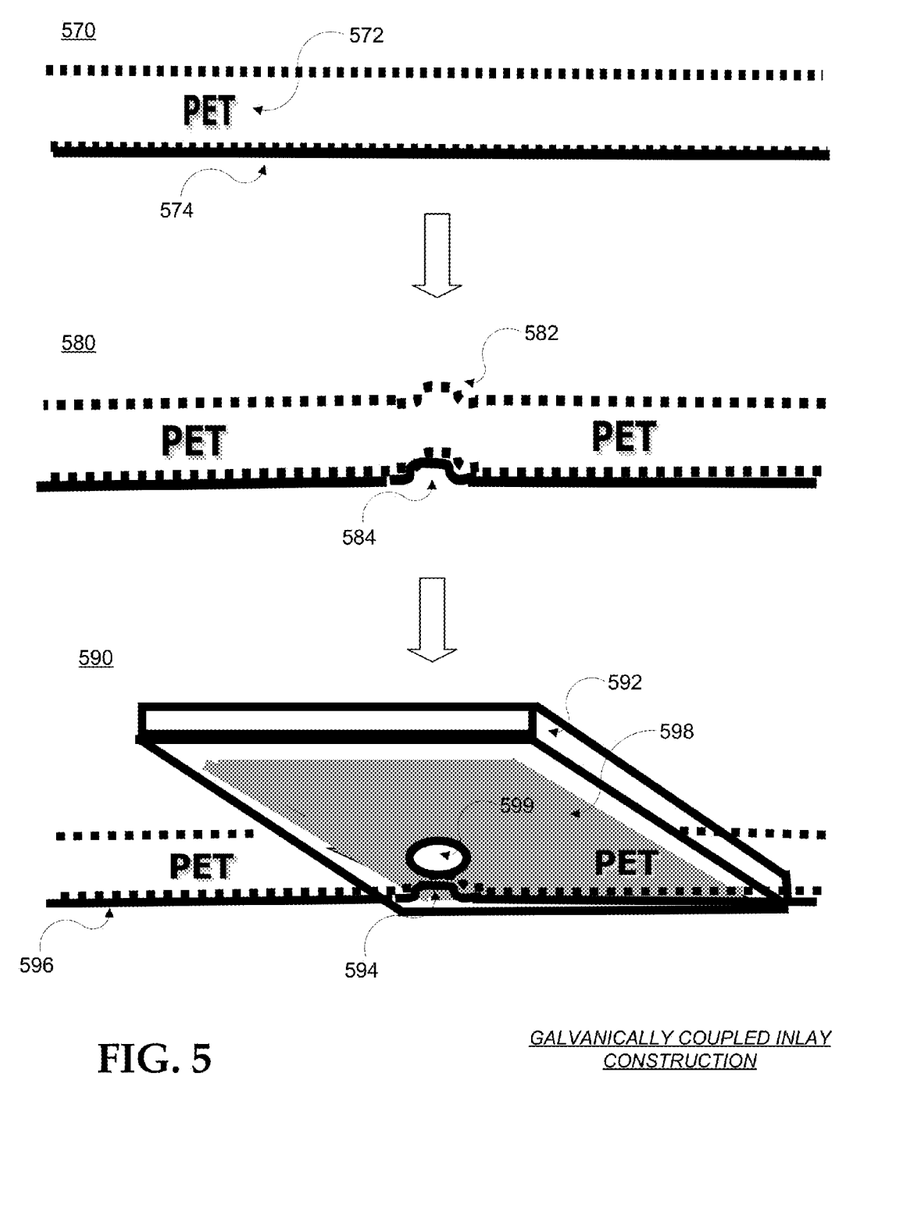
FIG. 5 illustrates an example galvanically-coupled inlay construction.

FIG. 5 illustrates an example galvanically-coupled inlay construction. As mentioned above, galvanic coupling may also be provided between the antenna and the IC through the use of conductive patch(es) on the IC. The antenna may be formed by sputtering conductive pattern 574 on a surface of a non-conductive material such as PET 572 as shown in diagram 570.

Subsequently (e.g. following an embossing process), a small dimple (e.g. approximately 30 µm in diameter) 584 may be placed on the conductive trace, which typically results in a similar dimple on the PET material as well (582) as shown in diagram 580.

When the die 592 with its conductive patch 598 is pressed onto the antenna (such as by heating the die and allowing it to sink into the PET), a direct connection is made between the conductive trace of the antenna 596 and the conductive patch 598 of the IC at location 599. Thus a galvanic coupling is achieved as shown in diagram 590.

If multiple capacitors are formed employing multiple conductive patches on the IC, some or those may be coupled to the antenna galvanically while others are coupled capacitively.

Figure 6:
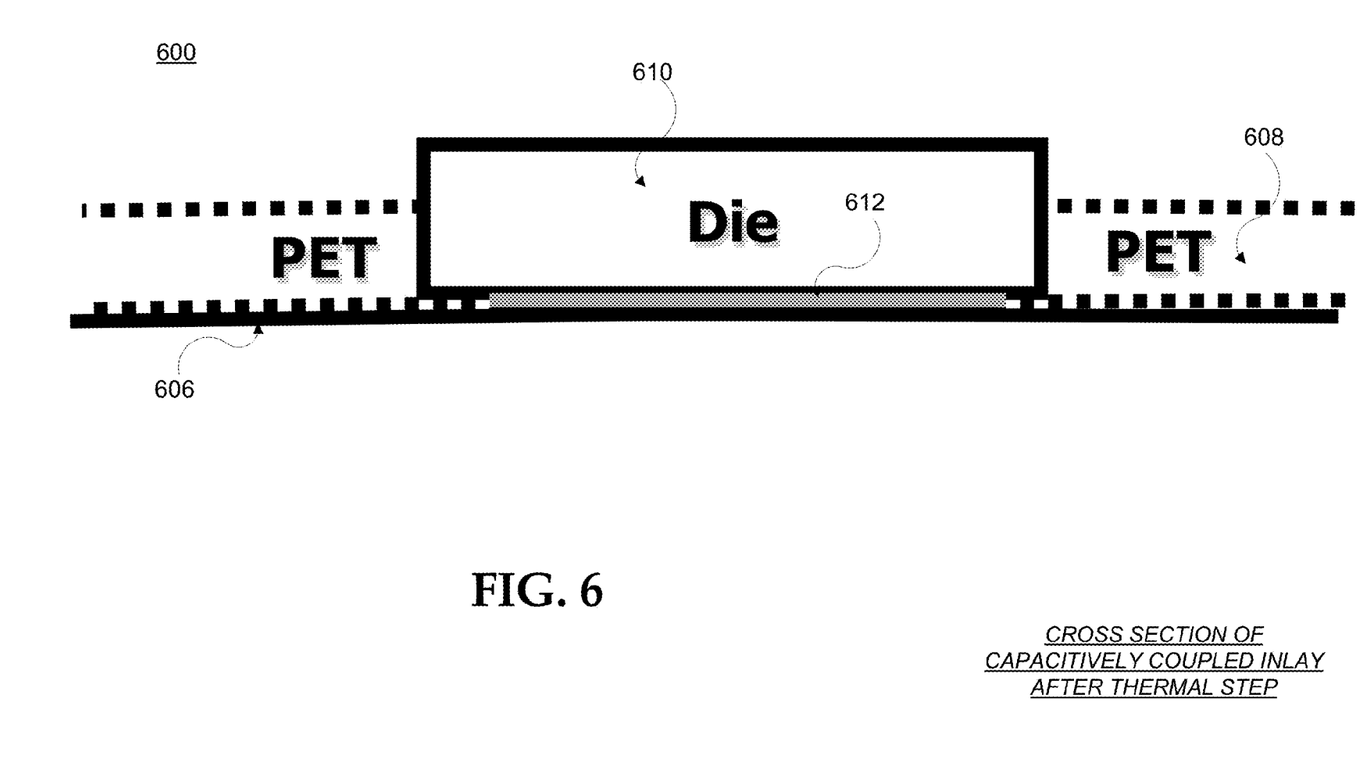
FIG. 6 illustrates a cross section of a capacitively-coupled inlay following thermal bonding step according to embodiments.

FIG. 6 illustrates a cross section of a capacitively-coupled inlay following thermal bonding step according to embodiments.

The example tag assembly in diagram 600 includes die 610 containing electrical circuitry and traces of the tag IC inserted into the dielectric material (e.g. PET) 608 covering conductive traces of the tag antenna 606. AC coupling between the tag IC and the antenna traces is provided by a capacitor formed between one or more conductive patches disposed on the surface of the die 610 and the antenna traces 606. The dielectric of the capacitor may include a portion of the PET, any non-conductive covering layer of the die 610 and/or an additional dielectric layer 612 inserted between the antenna and the die.

The additional dielectric layer 612 may include a naturally occurring or artificially grown oxide layer of the antenna traces, an adhesive dielectric material, or other materials.

According to some embodiments the IC may not be directly coupled to the antenna but through an interposer layer. For example, a strap may be capacitively coupled to the IC as discussed above and the antenna later coupled to the strap. Thus, the tag assembly may include additional connection layers between the antenna and the IC using the principles described herein.

According to further embodiments, affixing the antenna to the IC may include terminating a metal deposition and patterning process of the IC before a passivation layer is deposited, depositing passivation material comprising the dielectric material, singulating the IC from a completed wafer, and pressing together the antenna, the dielectric material, and the IC. The dielectric material may include a material with relatively high (e.g. >8) dielectric constant such as Hafnium oxide, Zirconium oxide, Hafnium oxide silicate, Zirconium oxide silicate, and Strontium-Titanium-oxide. Alternatively, the wafer process may be completed as is known in the art including the passivation deposition and pad opening etch, and then the IC singulated and pressed with the antenna and the dielectric material.

Figure 7:
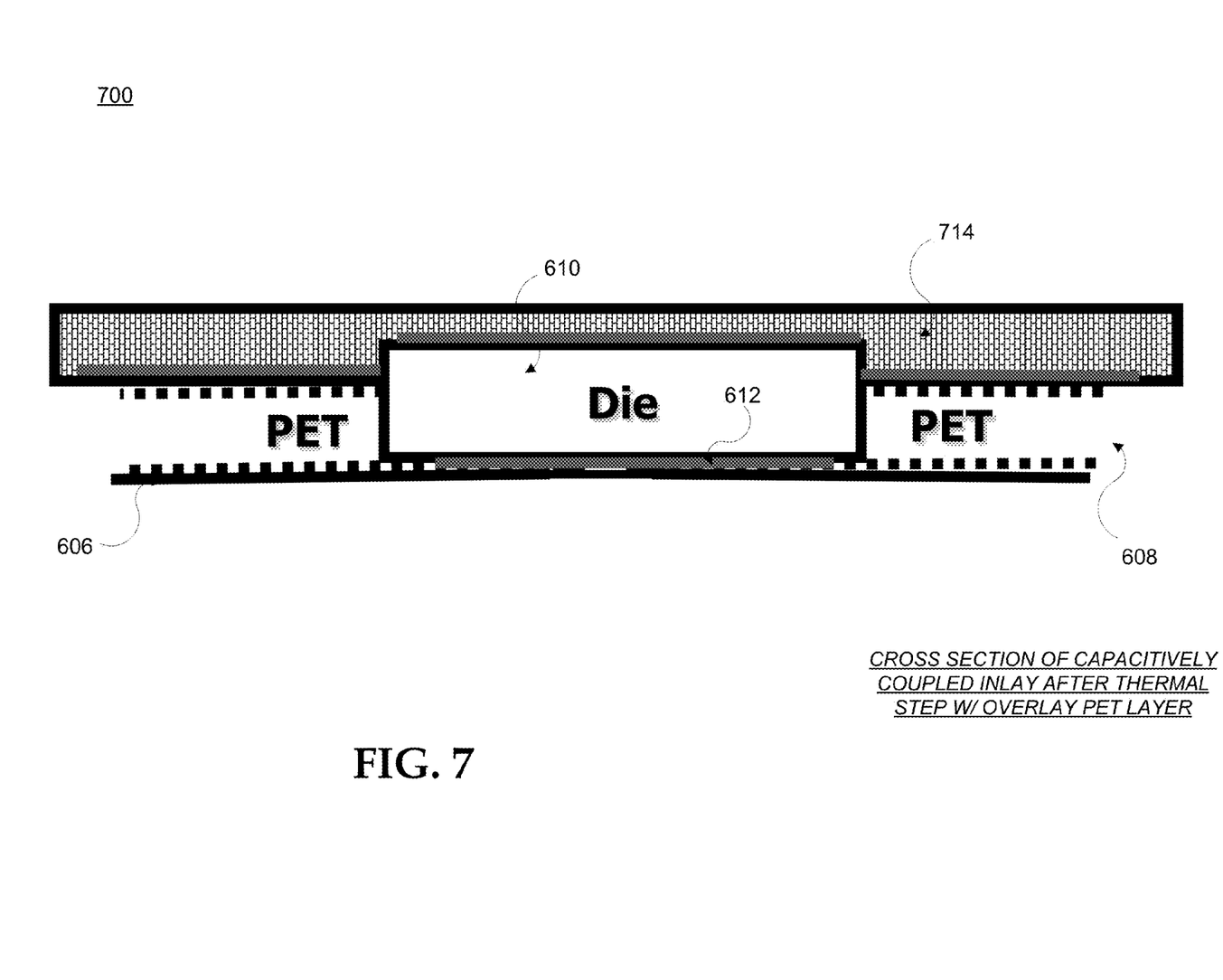
FIG. 7 illustrates the cross section of the capacitively-coupled inlay with an overlay PET layer for additional strength according to one embodiment.

FIG. 7 illustrates the cross section of the capacitively-coupled inlay with an overlay PET layer for additional strength according to one embodiment.

The example tag assembly shown in diagram 700 is similar to the tag assembly of FIG. 6 with the addition of an overlay PET (or other material) layer 714 added for enhanced strength of the assembly. The overlay 714 may be affixed through adhesive or other means depending on the tag design and use. For example, the antenna layer may be disposed directly onto a host item, the IC then pressed onto the antenna layer as discussed and the overlay placed over the assembly. The overlay may also include additional characteristics such as being a writeable label, and the like.

Figure 8:
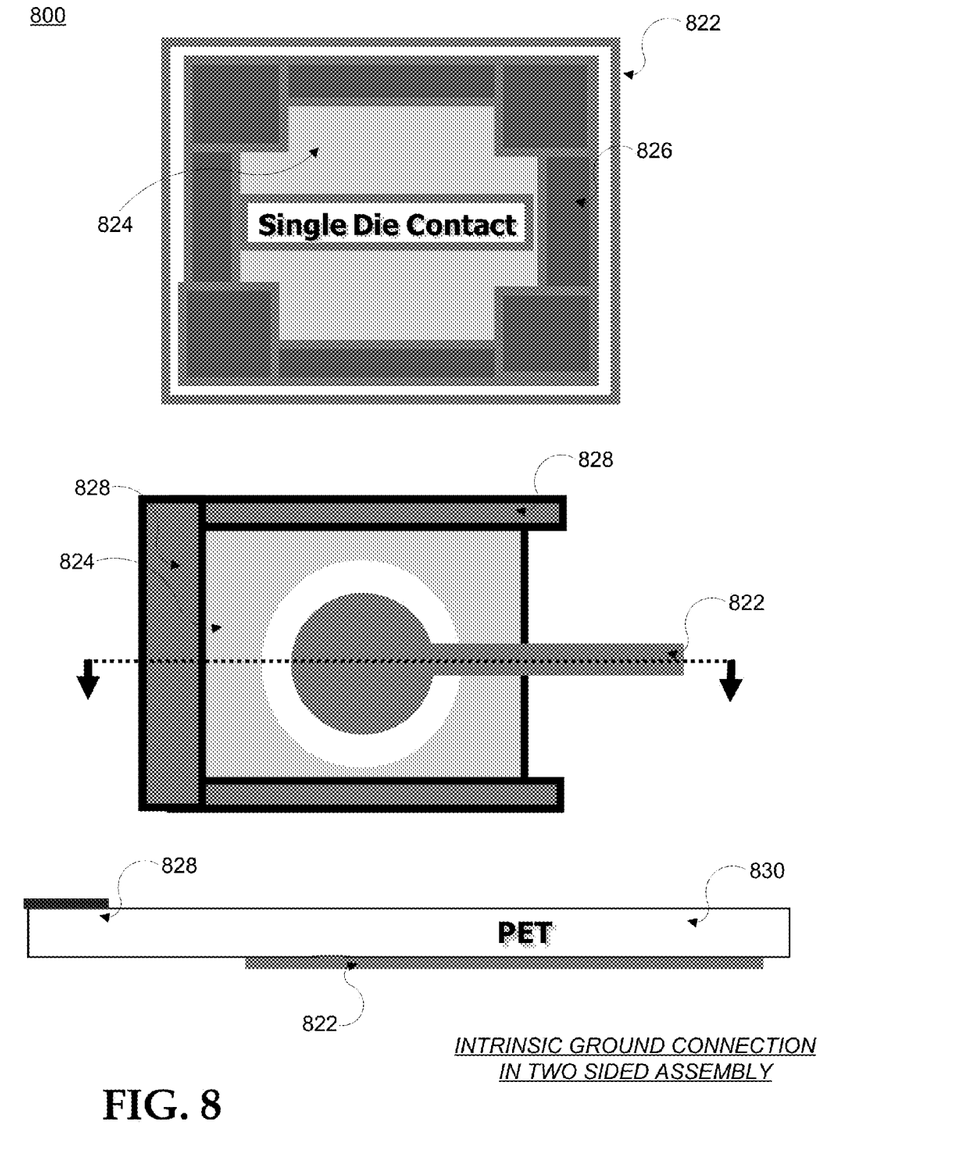
FIG. 8 illustrates an alternate assembly method for intrinsic ground connection in a two-sided tag assembly.

FIG. 8 illustrates an alternate assembly method for intrinsic ground connection in a two-sided tag assembly.

Diagram 800 shows a top view of die 824 with non-conductive (e.g. PET) layer 826 and a view of the metalized PET inlay, where top metal 828 is connected to die edge while bottom metal 822 is connected to die center.

This configuration is further illustrated in the bottom diagram of the figure with the top metal 828 being placed along the die edge and the bottom metal 822 providing connection to the die center with the PET layer 830 between the metal layers. In embodiments, where galvanic connection is provided, one or both of the top or bottom metals may be embossed and pressed into the PET layer to achieve contact connection with the die.

Figure 9:
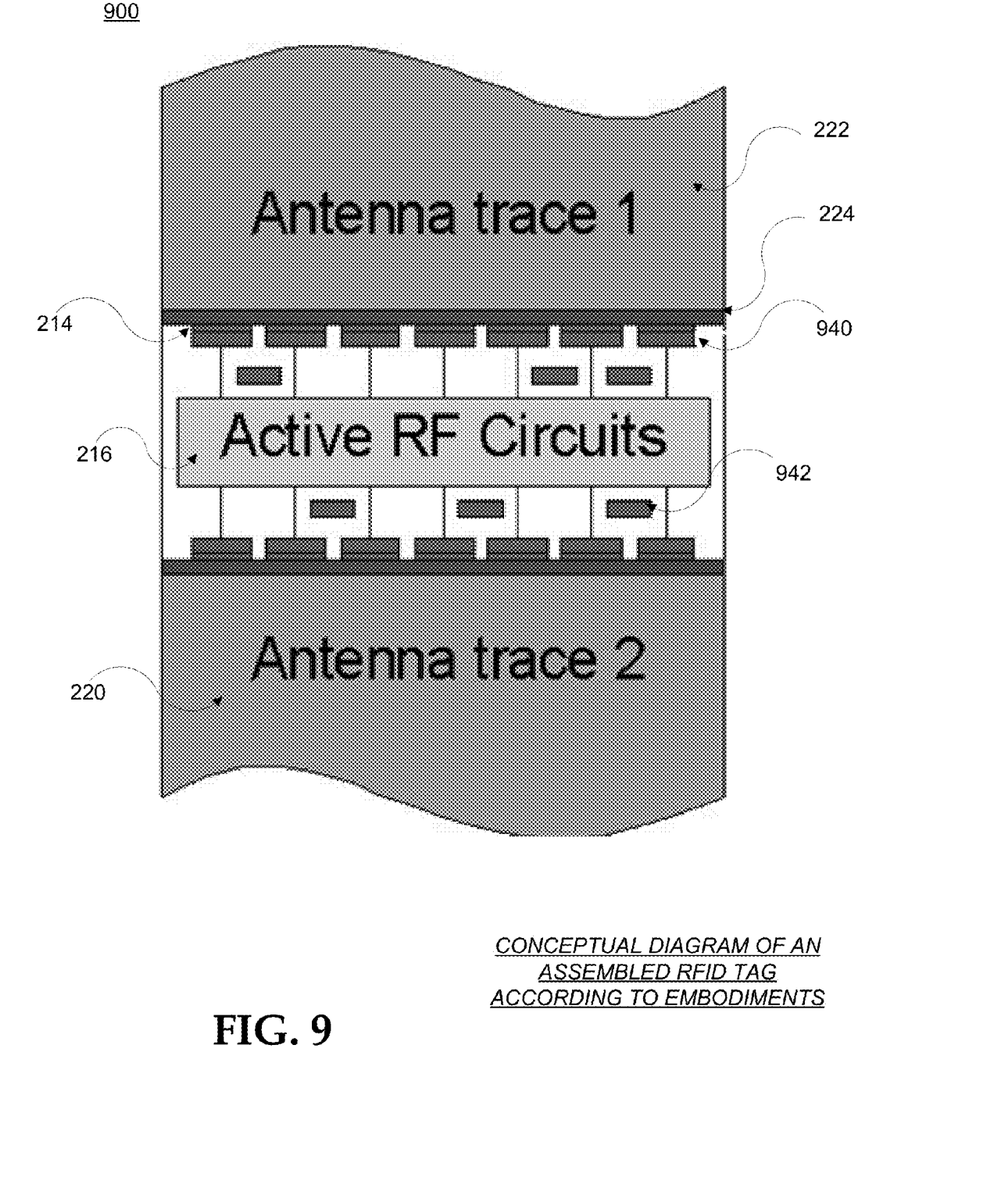
FIG. 9 illustrates a conceptual diagram of an assembled RFID tag similar to the diagram of FIG. 2 employing assembly methods according to embodiments.

FIG. 9 illustrates a conceptual diagram of an assembled RFID tag similar to the diagram of FIG. 2 employing assembly methods according to embodiments.

Diagram 900 illustrates differences between conventional tag assembly methods and tag assemblies according to embodiments. By employing conductive patches 940 on IC surface, capacitive coupling between antenna traces (220, 222) and the active RF circuits 216 of the tag is achieved. This reduces parasitic capacitance between tag traces 942 and the antenna traces significantly. Furthermore, RF distribution resistance caused by the RF distribution bus is also eliminated since the RF distribution bus is no longer needed.

The capacitors between the antenna traces and the IC circuits may include an oxide layer 224 of the antenna traces and/or a covering layer of the antenna/IC as dielectric material. Dielectric characteristics of these materials may be controlled through their composition and thickness (e.g. enhanced growth of the oxide layer, controlled thickness of the PET layer, etc.) enabling tag designers to set predefined capacitance values.

Mechanical limitations such as use of gold topped bumps, accurate alignment, and controlled mount force are also significantly reduced since the conductive patches may be implemented as large as the IC surface. This results in reduced number of assembly steps and increased reliability and throughput.

Figure 10:
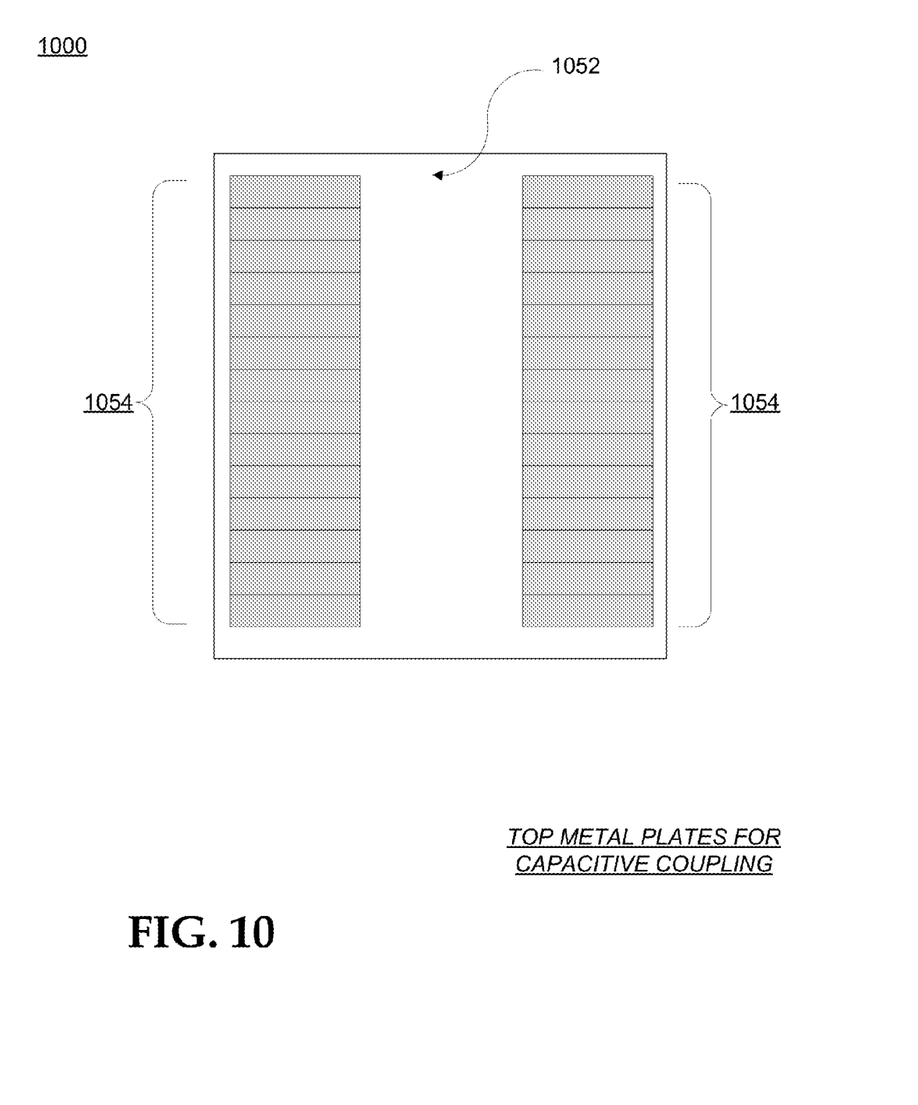
FIG. 10 illustrates top metal plates in a tag assembly with capacitive coupling according to one embodiment.

FIG. 10 illustrates top metal plates in a tag assembly with capacitive coupling according to one embodiment.

As discussed previously, a plurality of conductive patches may be employed to provide capacitive coupling between the antenna layer and RF circuitry of the tag IC. Diagram 1000 shows and example layout of two sets of top metal plates (conductive patches) 1054 on chip 1052. These patches reduce resistance in RF distribution by eliminating a need for the RF distribution bus. Since passive RFID tags are powered by incident RF waves, efficient distribution of RF energy is a significant aspect of tag design.

In addition to increasing the efficiency of RF energy distribution, such an approach also minimizes parasitic capacitance between signal traces of the tag IC and the antenna traces, and enables having different circuits of the tag at different DC potentials by keeping some of the conductive patches separate from each other.

Embodiments also include methods of assembling a tag as described herein. An economy is achieved in the present document in that a single description is sometimes given for both methods according to embodiments, and functionalities of devices made according to embodiments.

Embodiments may be implemented using programs executed by fully or partially automated tag manufacturing equipment. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter and in the more general case can include the states of any physical devices or elements.

Embodiments may furthermore include storage media for storing the programs discussed above. A storage medium according to the embodiments is a machine-readable medium, such as a memory, and is read by a processor controlling a tag assembly machine for assembling tags according to embodiments. If a memory, it can be implemented in a number of ways, such as Read Only Memory (ROM), Random Access Memory (RAM), etc., some of which are volatile and some non-volatile.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

We claim:

1. A method for assembling a Radio Frequency Identification (RFID) tag, the method comprising:
affixing an integrated circuit (IC) to an antenna of the tag by forming a plurality of distinct conductive patches on the IC for coupling electrical circuitry of the IC to the antenna through a dielectric material, wherein:
the dielectric material includes at least one of a covering layer of the IC and a covering layer of the antenna; and
the plurality of distinct conductive patches are capacitively coupled to a rectifier circuit, a demodulator circuit, and a modulator circuit.

2. The method of claim 1, wherein the covering layer of the antenna includes an oxide layer formed on a conductive trace layer of the antenna.

3. The method of claim 2, wherein the covering layer of the antenna includes one from a set of: a naturally occurring aluminum oxide, an enhanced growth of aluminum oxide, and a grown layer of aluminum nitride on a conductive trace layer of the antenna formed substantially from aluminum.

4. The method of claim 1, further comprising:
forming an additional dielectric layer between the covering layer of the antenna and the covering layer of the IC.

5. The method of claim 4, wherein the additional dielectric layer comprises adhesive material with controlled dielectric characteristics such that a capacitance between the antenna and the electrical circuitry of the IC is greater than a predetermined value.

6. A method for assembling a Radio Frequency Identification (RFID) tag, the method comprising:
affixing an integrated circuit (IC) to an antenna of the tag by forming a plurality of distinct conductive patches on the IC for coupling electrical circuitry of the IC to the antenna through a dielectric material, wherein:
the plurality of distinct conductive patches cover substantially an entire surface of the IC adjacent to the antenna;
the dielectric material includes at least one of a covering layer of the IC and a covering layer of the antenna; and
the plurality of distinct conductive patches are capacitively coupled to a rectifier circuit, a demodulator circuit, and a modulator circuit.

7. The method of claim 6, wherein a terminal of the antenna is affixed to a first surface of the IC, and the method further comprises:
affixing another antenna terminal to a second surface of the IC opposite the first surface, wherein at least one of the plurality of distinct conductive patches is on the first surface of the IC and another one of the plurality of distinct conductive patches is on the second surface of the IC.

8. The method of claim 6, wherein affixing the antenna to the IC includes:
terminating a metal deposition and patterning process of the IC before a passivation layer is deposited;
depositing on the IC a passivation material comprising the dielectric material; and pressing together the antenna, the dielectric material, and the IC.

9. The method of claim 6, wherein the covering layer of the antenna includes an oxide layer formed on a conductive trace layer of the antenna.

10. The method of claim 9, wherein the covering layer of the antenna includes one from a set of: a naturally occurring aluminum oxide, an enhanced growth of aluminum oxide, and a grown layer of aluminum nitride on a conductive trace layer of the antenna formed substantially from aluminum.

11. The method of claim 6, further comprising:
forming an additional dielectric layer between the covering layer of the antenna and the covering layer of the IC.

12. The method of claim 11, wherein the additional dielectric layer comprises adhesive material with controlled dielectric characteristics such that a capacitance between the antenna and the electrical circuitry of the IC is greater than a predetermined value.

13. The method of claim 6, wherein affixing the antenna to the IC includes:
terminating a metal deposition and patterning process of the IC before a passivation layer is deposited;
depositing on the IC a passivation material comprising the dielectric material; and
pressing together the antenna, the dielectric material, and the IC.

\* \* \* \* \*